R. K. FOX.
EXTENSION PIANO PEDAL.
APPLICATION FILED AUG. 19, 1916.

1,226,494.

Patented May 15, 1917.

Richard K. Fox.
INVENTOR.

UNITED STATES PATENT OFFICE.

RICHARD K. FOX, OF COLORADO SPRINGS, COLORADO.

EXTENSION PIANO-PEDAL.

1,226,494.  Specification of Letters Patent.  Patented May 15, 1917.

Application filed August 19, 1916.  Serial No. 115,914.

*To all whom it may concern:*

Be it known that I, RICHARD K. FOX, a citizen of the United States, residing at 558 East Platte avenue, in the city of Colorado Springs, in the county of El Paso and State of Colorado, have invented certain new and useful Improvements in Extension Piano-Pedals, of which the following is a specification.

My invention relates to an extension pedal device for attaching and connecting to the pedals of pianos, whereby the same may be operated by children or other persons whose lower limbs are too short to reach the piano pedals; the same being so adapted for the purpose intended that it may be instantly positioned for use, changed so that the piano pedals may be operated by the feet of a player without inconvenience, and removed bodily when not longer necessary.

Other novel features of construction and combination of parts will be more fully described and claimed, reference being had to the accompanying drawings, in which—

Figure 1:
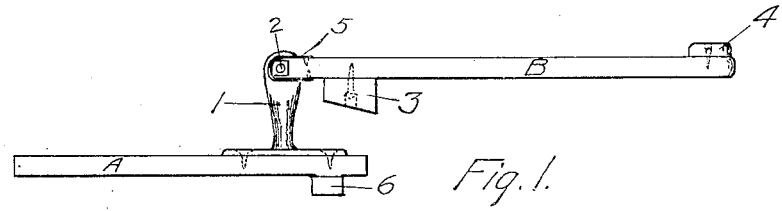
Figure 2:
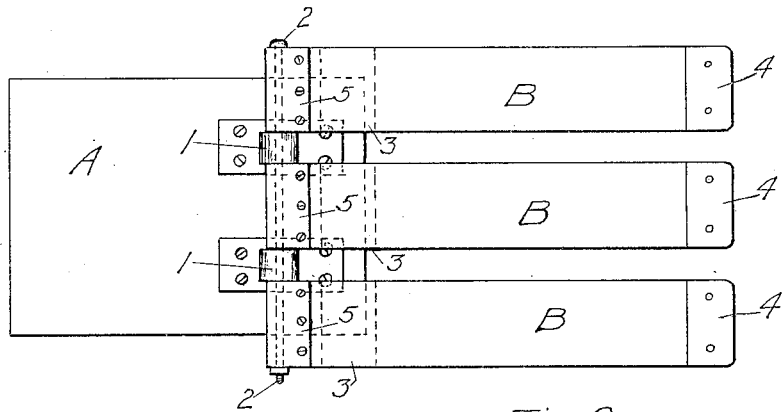
Figure 3:
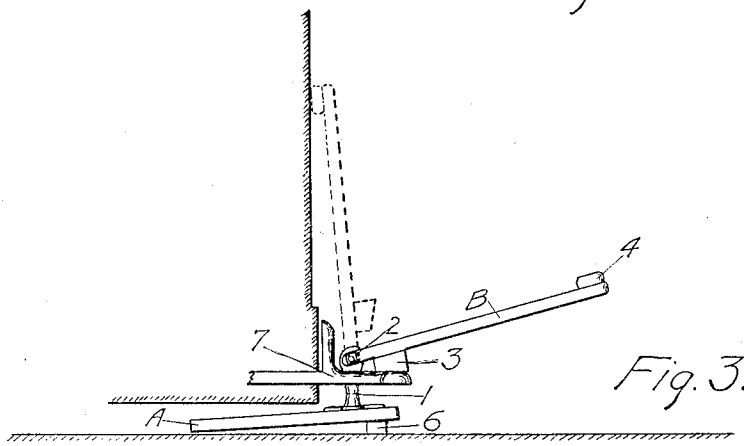

Figure 1 is a side elevation of the piano pedal extension; Fig. 2 is a plan or top view, and Fig. 3 shows the pedal extension in position to operate the pedal of a piano. The position of the pedal extension when raised out of the way for the direct operation of the piano pedal, is shown by the dotted lines in Fig. 3.

In the drawings, A is a base block, on which is fastened by suitable means, two metal posts, 1. Through the top of each post passes movably, a bolt, 2, of metal, that securely holds, hingelike, the extension pedal, B. The extension pedals, B, are each a narrow board, through one end of which is a hole through which passes movably the bolt, 2, which holds the extension pedal, B, securely hinge-like, in the proper position in relation to the piano pedals on which they act.

A block, 3, of soft elastic material, is attached to each extension pedal at such point on the under side of each extension pedal so as to rest squarely on the ball end of the piano pedal, thus giving the extension pedal the proper angle so that the free end will be at the proper elevation to be easily reached by the child's foot.

A tip, 4, of soft elastic material, suitably fastened on the upperside of the free end of the extension pedal keeps the foot from slipping off the extension pedal, and acts as a cushion when the extension pedal is raised and the free end rests against the piano as shown dotted in Fig. 3.

A metal clip, 5, fastens securely over the hinge end of the extension pedal to reinforce the part where the bolt passes through.

A nut on the end of the bolt, holds the extension pedals securely in place.

A small wooden strip, 6, under the forward end of the base A, holds the device at the proper height, the thickness being varied according to the height of the pedals of the piano upon which the device is to be used.

In Fig. 3, 7 represents the pedal of a piano upon which rests the soft elastic block 3, supporting the extension pedal B.

In the above described construction, while I have specifically described the relative arrangement and construction of the several elements of my invention, I do not desire to be confined to the same, as such changes and modifications may be made as clearly fall within the scope of my invention without departing from the spirit thereof.

Having thus described my invention, what I claim as new and desire to secure by Letters Patent is:—

An extension piano pedal device comprising a flat base block, two metal posts mounted thereon, a bolt removably secured to the tops of said posts, extension pedals hinged on the bolt, a soft elastic block adjusted to the under side of each extension pedal near the hinge end the distance between the pedal operated upon and the extension pedal at the point of support on the pedal being greater than the distance between the pedal and the hinge for the extension pedal, thus elevating the free end of the extension pedal, a soft elastic tip on the upper side of the free end of each extension pedal, and a detachable adjusting strip under the end of the flat base block nearest the posts.

In testimony whereof I affix my signature.

RICHARD K. FOX.

Copies of this patent may be obtained for five cents each, by addressing the "Commissioner of Patents, Washington, D. C."